United States Patent
Gonzalez et al.

(10) Patent No.: US 10,661,915 B2
(45) Date of Patent: May 26, 2020

(54) ENGINE EXHAUST-STACK PLUG

(71) Applicants: David Jeshreel Gonzalez, Andover, KS (US); August Andrew Kuklinski, Wichita, KS (US); Michael Leroy O'Grady, Goddard, KS (US); Glen Allen Basler, Derby, KS (US)

(72) Inventors: David Jeshreel Gonzalez, Andover, KS (US); August Andrew Kuklinski, Wichita, KS (US); Michael Leroy O'Grady, Goddard, KS (US); Glen Allen Basler, Derby, KS (US)

(73) Assignee: Textron Innovations, Inc., Providence, RI (US)

( * ) Notice: Subject to any disclaimer, the term of this patent is extended or adjusted under 35 U.S.C. 154(b) by 187 days.

(21) Appl. No.: 16/027,596

(22) Filed: Jul. 5, 2018

(65) Prior Publication Data
US 2020/0010213 A1    Jan. 9, 2020

Related U.S. Application Data

(60) Provisional application No. 62/528,629, filed on Jul. 5, 2017.

(51) Int. Cl.
*B64F 1/00*      (2006.01)
*F02C 7/00*      (2006.01)
*B64D 33/04*    (2006.01)

(52) U.S. Cl.
CPC ............... *B64F 1/005* (2013.01); *F02C 7/00* (2013.01); *B64D 33/04* (2013.01); *F05D 2220/323* (2013.01)

(58) Field of Classification Search
CPC .......... B64F 1/005; B64F 1/027; B64F 1/029; B64F 1/0295; B64F 1/228
See application file for complete search history.

(56) References Cited

U.S. PATENT DOCUMENTS

| | | | |
|---|---|---|---|
| 3,745,907 | A | 7/1973 | Zarfoss et al. |
| 5,873,256 | A | 2/1999 | Denniston |
| 8,777,154 | B2 | 7/2014 | Alexander et al. |
| 9,550,581 | B2 | 1/2017 | Loureiro |

*Primary Examiner* — Ehud Gartenberg
*Assistant Examiner* — Jacek Lisowski
(74) *Attorney, Agent, or Firm* — Erise IP, P.A.

(57) ABSTRACT

An engine exhaust-stack plug for sealing an exhaust stack of an aircraft engine is provided. The exhaust-stack plug includes a desiccant and a flexible plug adapted to slide into an outlet of an engine exhaust-stack. The flexible plug includes a front panel that is substantially impermeable to water vapor and is accessible from the outlet of the engine exhaust-stack. An outer wall, which is also substantially impermeable to water vapor, is sealed with the front panel and shaped to fit snuggly within the outlet of the engine exhaust stack. A backside is coupled with the outer wall, opposite the front panel, for facing internal to the engine exhaust stack. The front panel, the outer wall, and the backside form an enclosure adapted to contain the desiccant. The backside is substantially air permeable such that the desiccant reduces humidity and prevents condensation inside the aircraft engine.

15 Claims, 4 Drawing Sheets

ENGINE EXHAUST-STACK PLUG

CROSS-REFERENCE TO RELATED APPLICATIONS

This application claims the benefit of U.S. Provisional Patent Application Ser. No. 62/528,629 entitled Engine Exhaust-Stack Plug and filed Jul. 5, 2017, the disclosure of which is herein incorporated by reference in its entirety.

BACKGROUND

1. Field

Embodiments of this disclosure relate generally to the field aircraft storage and maintenance, and more specifically to preservation of inactive gas-turbine engines.

2. Description of the Related Art

Different types of engine covers and different types of desiccant-dehumidification systems are described in the prior art. U.S. Pat. No. 8,777,154 to Alexander et al. discloses a single-use engine outlet cover that provides a seal on the outside of an exhaust outlet and a desiccant attached to an inner side of the cover. U.S. Pat. No. 5,873,256 to Denniston discloses a desiccant-based dehumidification system for absorbing moisture from an air stream of a motorized vehicle. Specifically, a desiccant wheel and a source of heat are used to reduce humidity in a vehicle cabin. U.S. Pat. No. 9,550,581 to Loureiro discloses a gas-turbine engine cover that extends over a portion of an air intake lip of the engine. The cover may be deployed using a pole so that an operator can install the cover without needing a ladder. U.S. Pat. No. 3,745,907 to Zarfoss et al. discloses an exhaust stack closure that includes a cap connected to a pivotable support frame. The cap is sealed to the exhaust end to prevent the exhaust of gases from the stack.

SUMMARY

In an embodiment, an engine exhaust-stack plug is provided. The engine exhaust-stack plug includes a desiccant and a flexible plug adapted to slide into an outlet of an engine exhaust-stack. The flexible plug includes a front panel that is substantially impermeable to water vapor and is accessible from the outlet of the engine exhaust-stack. An outer wall is sealed with the front panel and is also substantially impermeable to water vapor. The outer wall is shaped to fit snuggly within the outlet of the engine exhaust stack. A backside is opposite the front panel for facing internal to the engine exhaust stack. The backside is substantially air permeable and coupled with the outer wall. The front panel, the outer wall, and the backside form an enclosure adapted to contain the desiccant for reducing humidity and preventing condensation inside an aircraft engine.

In another embodiment, an exhaust-stack plug for sealing an exhaust stack of a turboprop engine is provided. The exhaust-stack plug includes a moisture barrier that is substantially impermeable to water vapor and a compartment that is adjacent to the moisture barrier, such that when the moisture barrier is installed, the compartment is inside the exhaust-stack plug. A desiccant is located in the compartment for reducing humidity within the turboprop engine, and a humidity monitor is located in the compartment for providing an indication of a humidity level inside the turboprop engine.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Ground maintenance of aircraft routinely includes protocols and equipment for storing aircraft when not in use (e.g., for a week or more). This helps to preserve aircraft components for conserving their service life and reducing potential safety hazards. Preservation of gas-turbine engines (e.g., turboprop engines) typically involves sealing a desiccant inside exhaust-stacks of the engines to reduce humidity. Sealing all engine openings provides a substantially closed internal cavity for providing reduced humidity and preventing condensation. Within a controlled volume, an appropriate amount of desiccant effectively reduces humidity by absorbing water vapor.

To protect the engine from damage that may be caused by contact with the desiccant, bags of the desiccant are often placed on wooden (e.g., plywood) racks that are positioned inside the exhaust-stack. Openings of the engine, (e.g., inlets, drains, and vents), are sealed with barrier material and tape to maintain low humidity provided by the desiccant. If the engine is being preserved on the aircraft, barrier material and tape are also used to seal the engine exhaust-stacks. The protocol is time consuming and labor intensive and typically requires more than one maintenance operator. To determine when the desiccant needs replacing, internal humidity is monitored. To replace the desiccant, the barrier material and tape are removed and discarded, and additional barrier material and tape are applied to reseal any openings made to replace the desiccant.

Embodiments of the present disclosure provide an improved system for sealing and monitoring an inactive gas turbine engine on an aircraft. The improved system reduces maintenance effort and time, and the cost of performing the method is reduced compared to the current protocol due to a reduction in the amount of consumable materials required.

Figure 1:
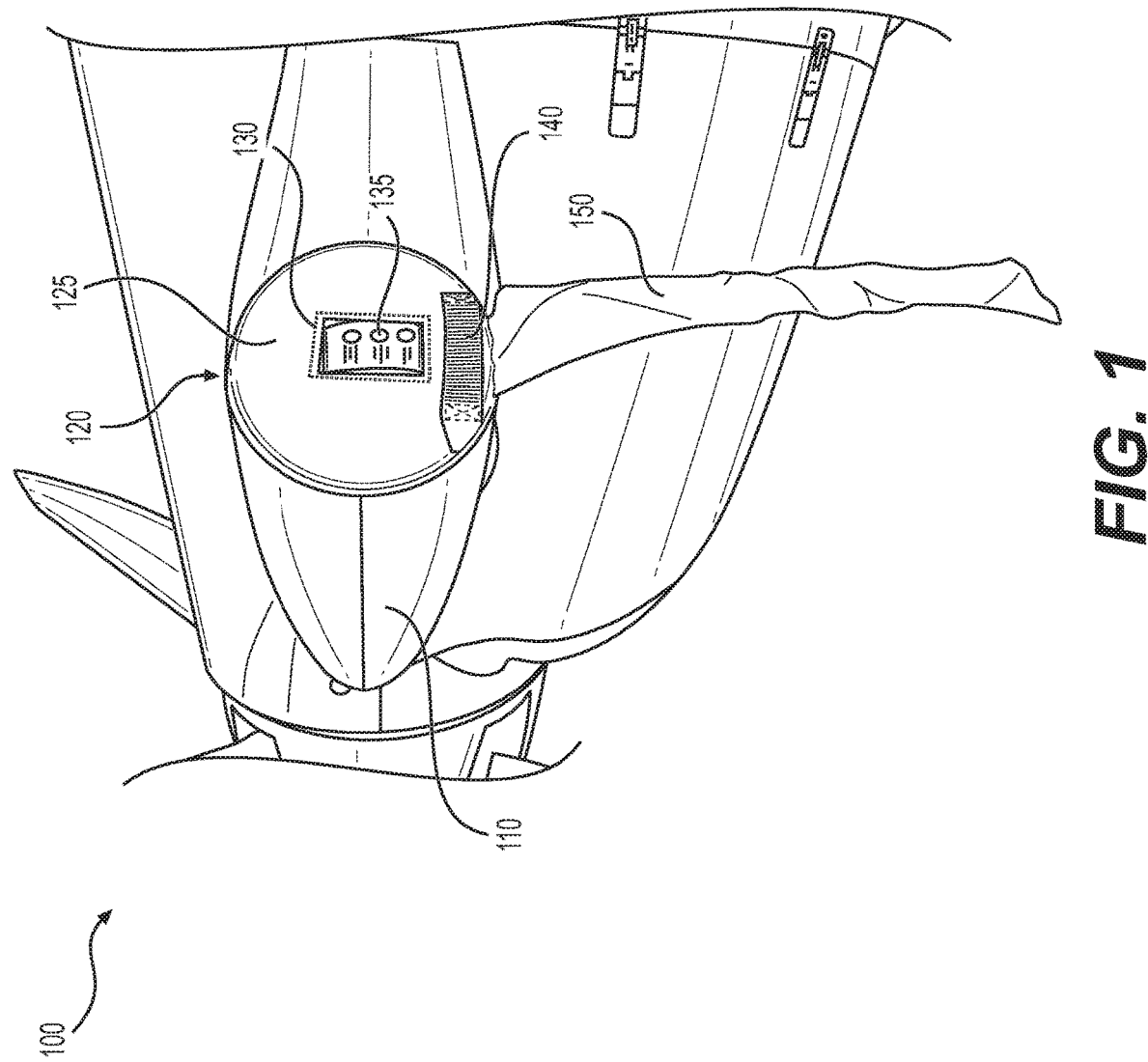
FIG. 1 is a perspective view of a turboprop engine having an engine exhaust-stack plug installed in an engine exhaust-stack, in an embodiment.

FIG. 1 is a perspective view of a turboprop engine 100 having an engine exhaust-stack 110. An engine exhaust-stack plug 120 is installed within an outlet of exhaust-stack 110 for sealing the outlet. In certain embodiments, a front panel 125 of stack plug 120 may protrude from the outlet of exhaust-stack 110. In some embodiments, front panel 125 may be positioned inside the opening of exhaust stack 110 but facing outwardly to be easily accessible to maintenance personnel.

Engine exhaust-stack plug 120 is a flexible plug adapted to slide into an outlet of engine exhaust-stack 110. The flexible plug is shaped to fit snuggly within exhaust-stack 110 for maintaining a water-vapor-tight seal. Engine exhaust-stack plug 120 provides a moisture barrier that is substantially impermeable to water vapor. The moisture barrier is reusable and provides a water-vapor seal without using consumable barrier material and tape. When installed in engine exhaust-stack 110, the exhaust-stack plug 120 also provides a compartment adjacent the moisture barrier and inside the exhaust-stack plug, as further described below in connection with FIG. 3. The compartment/enclosure contains a desiccant for reducing humidity within the engine.

Referring to FIG. 1, front panel 125 may include a monitoring window 130 that affords a view to maintenance personnel through front panel 125 for monitoring a humidity monitor 135. Alternatively, an electronic humidity sensor capable of wireless communication may be placed inside exhaust-stack plug 120 and monitored via a wireless communication device adapted to receive data from the humidity monitor 135.

A handle 140 is located on front panel 125 for assisting the maintenance operator with installation and removal of stack plug 120. A warning streamer 150 is attached to front panel 125 to indicate that stack plug 120 is part of ground support equipment and is to be removed before operation of engine 100.

Figure 2:
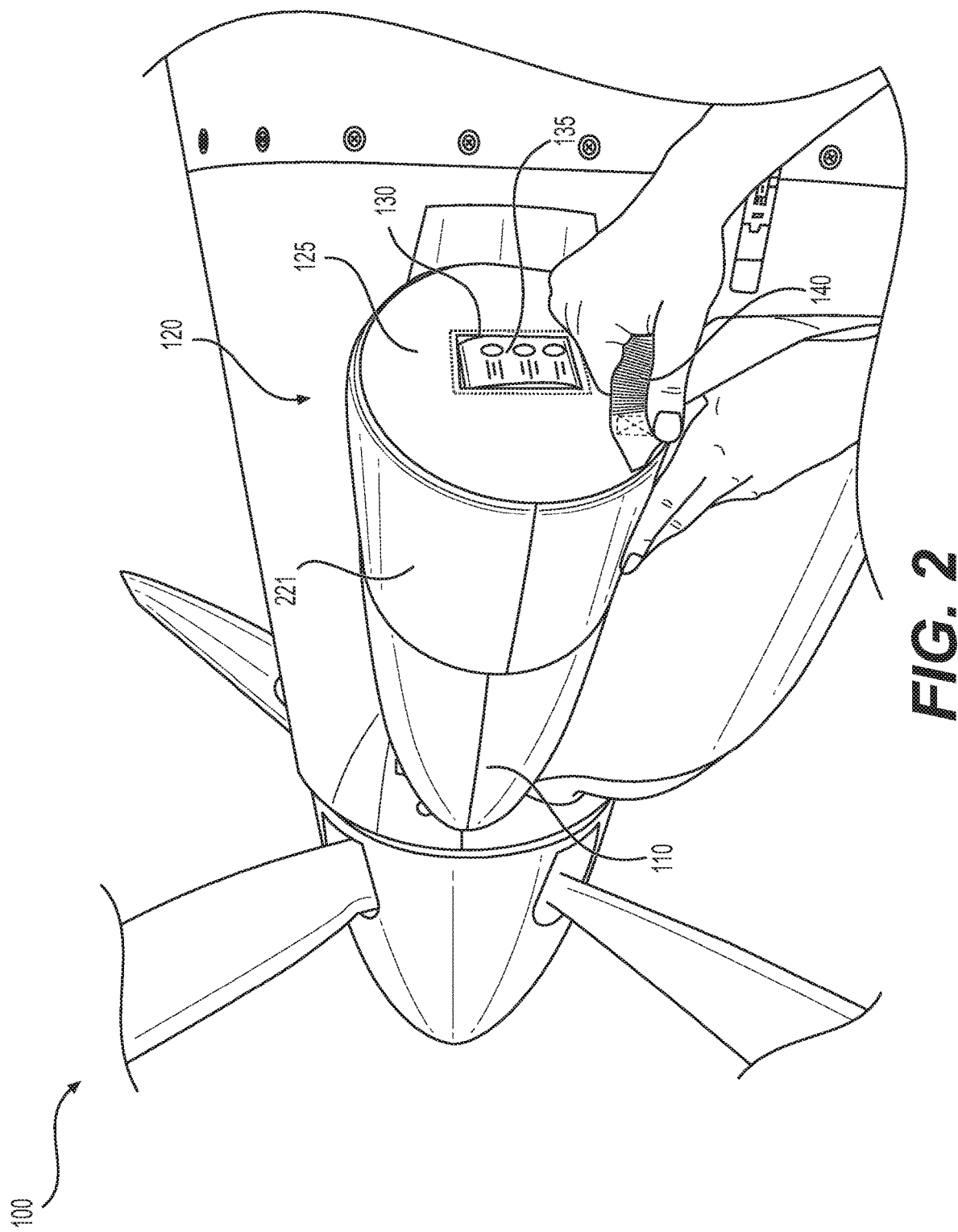
FIG. 2 shows the engine exhaust-stack plug of FIG. 1 partially removed from the engine exhaust-stack.

FIG. 2 shows engine exhaust-stack plug 120 partially removed from engine exhaust-stack 110 by a user via handle 140 revealing an outer wall 221 of exhaust-stack plug 120. In certain embodiments, outer wall 221 is bonded to front panel 125 to provide a seal that is substantially impermeable to water vapor. In some embodiments, outer wall 221 and front panel 125 are made of one contiguous piece of material shaped to fit snuggly within engine exhaust stack 110 and provide a substantially impermeable barrier to water vapor. Front panel 125 and outer wall 221 are made of a flexible material. In certain embodiments, the flexible material is an open-cell polyether foam, which has extremely low water-vapor transfer rates, is lightweight, and is resilient to chemical degradation. For example, cell polyether foam is resistant to water, oil, and aircraft fuels, such as Jet A, Jet B, and Aviation Gasoline. However, other polyether foams may also be used to provide an acceptable flexible material without departing from the scope hereof.

Figure 3:
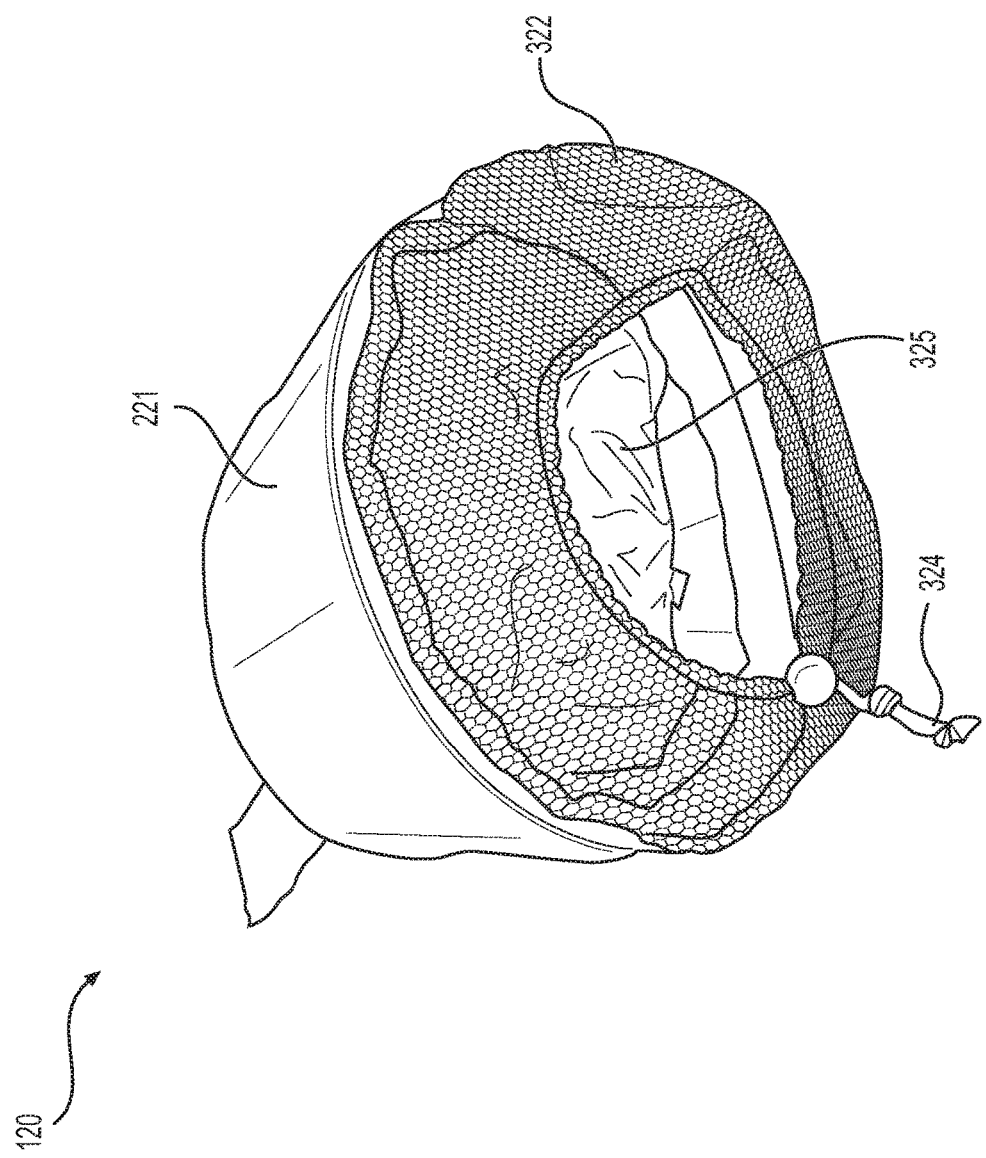
FIG. 3 is a perspective view of the engine exhaust-stack plug of FIGS. 1 and 2.

FIG. 3 is a perspective view of engine exhaust-stack plug 120, FIG. 1, removed from engine exhaust-stack 110. A backside 322 is located opposite front panel 125. In certain embodiments, backside 322 includes a mesh material that is permeable to air and a drawstring 324 for opening and closing stack plug 120. Other materials that permit sufficient water vapor transfer for the desiccant to maintain a low humidity environment inside engine exhaust-stack 110 may be used, rather than a mesh material, without departing from the scope hereof. Likewise, drawstring 324 may be replaced with one or more of zippers, buttons, snaps, and latches, or the like, for opening and securely closing stack plug 120.

Backside 322 enables a desiccant bag 325 to be removably stored within stack plug 120. Together, outer wall 221, front panel 125, and backside 322, form a compartment/enclosure for storing desiccant 325. Since backside 322 faces inwardly within engine exhaust-stack 110, and backside 322 is made of a highly air permeable material, desiccant 325 is exposed to air within internal portions of engine 100 to reduce internal humidity. Backside 322, which is attached to outer wall 221, forms an enclosure that prevents desiccant bag 325 from sliding into engine 100 and ensures that the desiccant does not contact any engine surfaces.

Figure 4:
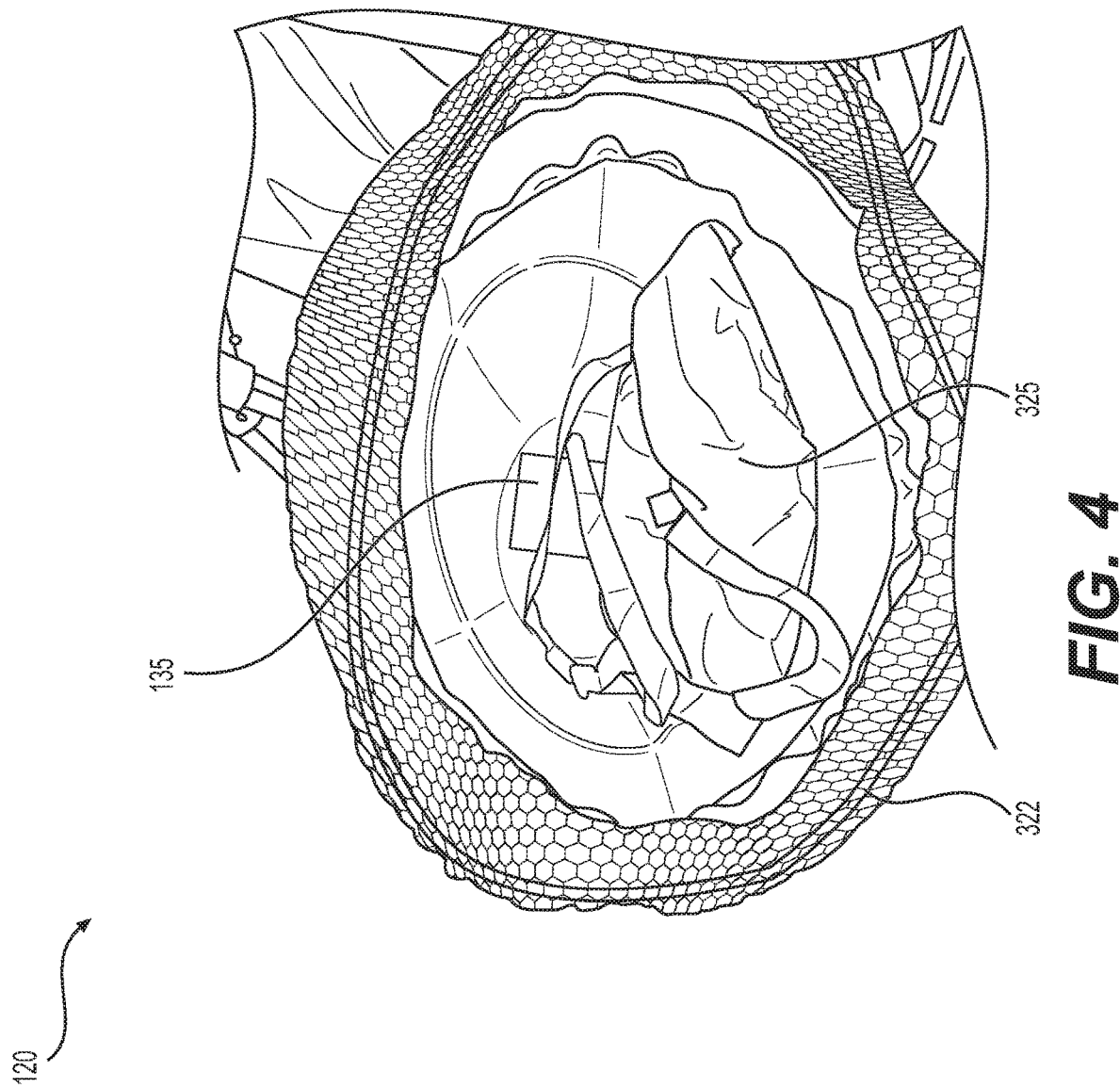
FIG. 4 is another perspective view of the engine exhaust-stack plug of FIGS. 1-3.

FIG. 4 is another perspective view of engine exhaust-stack plug 120 with backside 322 fully opened to permit access to desiccant bag 325. FIGS. 3 and 4 provide a view of a backside of stack plug 120, which is opposite front panel 125, FIG. 1. The backside of stack plug 120 is configured to be highly air permeable and may be opened and securely closed for replacing contents of stack plug 120. Humidity monitor 135 is attached to an inner side of monitoring window 130 and may also be accessed through the opening of backside 322 (e.g., for replacement). Humidity monitor 135 may be any type of sensor for monitoring humidity, including but not limited to humidity measurement paper and electronic humidity sensors.

In operation, a user places desiccant bag 325 inside engine exhaust-stack plug 120 and closes backside 322 via drawstring 324. The user then places exhaust-stack plug 120 inside the outlet of engine exhaust-stack 110 with backside 322 in first, as depicted in FIG. 2. Plug 120 may then be pushed further inside the outlet of exhaust-stack 110 (e.g., to the position depicted in FIG. 1). Once installed, plug 120 provides a substantially impermeable moisture seal between outer wall 221 and an inner surface of exhaust-stack 110. In combination with sealing any other engine openings, the moisture-impermeable seal provided by plug 120 and the dehumidification provided by desiccant 325 provide a low-humidity environment for preservation of engine 100.

During inactive periods, a user may periodically observe humidity monitor 135 through monitoring window 130 to ensure predetermined levels of low humidity are maintained inside. Alternatively, an electronic humidity sensor may be monitored through a wireless communication device.

For removal, a user simply pulls on handle 140 to remove exhaust-stack plug 120 from exhaust-stack 110. Once plug 120 is removed from exhaust stack 110, engine 100 is ready to return to service. Alternatively, desiccant bag 325 and/or humidity monitor 130 may be replaced and plug 120 may then be reinstalled in exhaust-stack 110.

Advantages provided by embodiments of this disclosure include a superior air seal, an increased life of desiccant, and a simpler and quicker installation process. Engine exhaust-stack plug 120 provides a cost-effective and reusable system for sealing an engine exhaust-stack that is lightweight and compact. Due to the superior air seal, an original desiccant may provide several months of engine preservation, which is a significant improvement compared to a current method using consumable barrier material and tape. Further, installation of the engine exhaust-stack plug may be quickly performed by an individual.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. An engine exhaust-stack plug, comprising:
   a desiccant; and
   a flexible plug adapted to slide into an outlet of an engine exhaust-stack, the flexible plug comprising:
     a front panel being substantially impermeable to water vapor, the front panel being accessible from the outlet of the engine exhaust-stack;

an outer wall sealed with the front panel and being substantially impermeable to water vapor, the outer wall shaped to fit snuggly within the outlet of the engine exhaust-stack;

and a backside opposite the front panel for facing internal to the engine exhaust-stack, the backside being substantially air permeable and coupled with the outer wall, wherein the backside further comprising one of a drawstring, a zipper, a button, a snap, or a latch for closing and opening the enclosure, wherein the front panel, the outer wall, and the backside form an enclosure adapted to contain the desiccant for reducing humidity and preventing condensation inside an aircraft engine.

2. The engine exhaust-stack plug of claim 1, further comprising a humidity monitor located inside the enclosure for indicating an internal humidity of the aircraft engine.

3. The engine exhaust-stack plug of claim 2, further comprising a viewing window located in the front panel for viewing the humidity monitor.

4. The engine exhaust-stack plug of claim 2, further comprising a wireless communication device adapted to receive data from the humidity monitor.

5. The engine exhaust-stack plug of claim 1, wherein the backside is made of a mesh material.

6. The engine exhaust-stack plug of claim 1, wherein the enclosure is adapted to contain the desiccant and ensure that the desiccant does not contact any engine surfaces.

7. The engine exhaust-stack plug of claim 1, further comprising a handle attached to the front panel for assisting with installation and removal of the flexible plug.

8. The engine exhaust-stack plug of claim 1, further comprising a warning streamer attached to the front panel for indicating that the engine exhaust-stack plug is used for ground support and is to be removed before operation of the aircraft engine.

9. The engine exhaust-stack plug of claim 1, wherein the flexible plug is reusable.

10. The engine exhaust-stack plug of claim 1, wherein the front panel and the outer wall are made of an open-cell polyether foam material.

11. An exhaust-stack plug for sealing an exhaust stack of a turboprop engine, comprising:
    a moisture barrier installed within the exhaust stack, the moisture barrier being substantially impermeable to water vapor;
    a compartment adjacent the moisture barrier, such that when the moisture barrier is installed, the compartment is inside the exhaust-stack plug;
    a desiccant located in the compartment for reducing humidity within the turboprop engine;
    and a humidity monitor located in the compartment for providing an indication of a humidity level inside the turboprop engine;
    wherein the compartment comprises an air permeable mesh bag for containing the desiccant to prevent the desiccant from contacting any portion of the turboprop engine.

12. The exhaust-stack plug of claim 11, further comprising a viewing window in the moisture barrier that enables a view of the humidity monitor.

13. The exhaust-stack plug of claim 11, further comprising an electronic humidity sensor capable of being monitored via a wireless communication device.

14. The exhaust-stack plug of claim 11, wherein the moisture barrier provides an air seal that increases a useful life of the desiccant to extend engine preservation without replacement of the desiccant.

15. The exhaust-stack plug of claim 11, further comprising a reusable moisture barrier that provides a water-vapor seal without using consumable barrier material and tape.

* * * * *